United States Patent [19]

Takada

[11] Patent Number: 4,925,618
[45] Date of Patent: May 15, 1990

[54] MOLD CLAMPING METHOD

[75] Inventor: Minoru Takada, Sakaki, Japan

[73] Assignee: Nissei Jushi Kogyo Kabushiki Kaisha, Nagano, Japan

[21] Appl. No.: 349,921

[22] Filed: May 9, 1989

Related U.S. Application Data

[62] Division of Ser. No. 161,120, Feb. 26, 1988, abandoned.

[30] Foreign Application Priority Data

Feb. 28, 1987 [JP] Japan .................................. 63-45983

[51] Int. Cl.$^5$ .............................................. B29C 45/67
[52] U.S. Cl. .............................. 264/328.1; 425/451.2; 425/451.9; 425/590; 425/595
[58] Field of Search ..................... 264/328.1; 425/150, 425/419, 450.1, 451, 451.2, 451.3, 451.7, 451.9, 589, 590, 591, 595; 100/269 R, 269 B, 273, 289; 92/107–111; 91/8, 9, 11, 437, 439, 450, 464, 415

[56] References Cited

U.S. PATENT DOCUMENTS

| | | | |
|---|---|---|---|
| 3,068,841 | 12/1962 | Robbins et al. | 91/519 |
| 3,156,014 | 11/1964 | Wenger | 425/595 |
| 3,452,397 | 7/1969 | Newton | 92/108 |
| 3,563,136 | 2/1971 | Valente | 91/519 |
| 3,656,877 | 4/1972 | Aoki | 425/590 |
| 3,786,725 | 1/1974 | Aoki | 91/519 |
| 3,818,801 | 6/1974 | Kime | 91/519 |
| 4,079,617 | 3/1978 | Whiting | 100/269 B |
| 4,158,327 | 6/1979 | Aoki | 91/519 |
| 4,380,427 | 4/1983 | Hehl | 425/590 |
| 4,409,884 | 10/1983 | Boehringer | 92/108 |
| 4,565,116 | 1/1986 | Hehl | 425/590 |
| 4,645,443 | 2/1987 | Aoki | 425/595 |

FOREIGN PATENT DOCUMENTS

| | | | |
|---|---|---|---|
| 1483972 | 6/1967 | France | 425/451.2 |
| 8300541 | 2/1983 | PCT Int'l Appl. | 92/108 |

OTHER PUBLICATIONS

Stewart et al., *ABC's of Hydraulic Circuits*, Howard W. Sams & Co., Inc., Indianapolis, IN, (1973), pp. 109–117.

*Primary Examiner*—Jill L. Heitbrink

[57] ABSTRACT

The method having a clamping cylinder which slidably fits a clamping ram whose front end is fixed on a movable board of an injection molding machine, etc., an inner space of the clamping cylinder divided into a rear chamber W and a front chamber X by a large-diameter piston section of the clamping ram, an inner rear wall of the clamping cylinder having a mold opening piston fixed thereto having a front end slidably fit in the clamping ram from the rear, an inner space of the clamping ram being divided into a chamber Y and a chamber Z opening to the atmosphere by the large-diameter piston section of the opening piston, a hydraulic controlling device which connects the chambers X, Y and Z to an oil pressure source and connects the chambers X and Y to the chamber W for a high-speed mold closure, which connects the chamber W to the oil pressure source and relieves the pressure in the chambers X and Y for a tight clamping, and which connects the chamber Y to the oil pressure source and connects the chamber W to both the chamber X and the oil tank for opening the mold, the effective pressure receiving area of the chamber Y being preferably designed to be equal to the cross-sectional area of the cylindrical section of the clamping ram.

1 Claim, 2 Drawing Sheets

MOLD CLAMPING METHOD

This application is a divisional, of application Ser. No. 161,120 filed on Feb. 26, 1988, now abandoned.

FIELD OF THE INVENTION

This invention relates to a mold clamping device preferred for injection molding machines and die casting machines.

PRIOR ART DISCUSSION

In the direct pressure type mold clamping devices for injection molding machines and die casting machines, it is necessary to open or close the molds at a high speed for reducing the time of the molding cycle. In addition, it is also necessary to clamp the molds with a large force to oppose the molding pressure.

To satisfy these antipodal operations, this particular type of mold clamping device generally has a complex structure. Further, many kinds of mold clamping devices are available. For example, a booster-ram type mold clamping device is shown in FIG. 5. In this device, a smaller-diameter booster ram 11 is slidably fit into a larger-diameter clamping ram 10. Oil is introduced into the smaller-diameter cylinder chamber 13 of the clamping ram 10 via an oil path 12 provided in the booster ram 11 for the high-speed mold closure. Then oil is also introduced into a rear chamber 14 of the clamping ram at a negative pressure from an oil tank 16 via a prefill valve 15. After closure of the mold, a high-pressure mold clamping is conducted by closing the prefill valve 15 and introducing oil into the rear chamber 14 of the clamping ram.

However, in the above stated booster ram type mold clamping device, the rear chamber 14 of the clamping ram 10 is at a negative pressure with respect to the high-speed advancing of the clamping ram. Therefore, attracting force introduces oil to the rear chamber 14 from the oil tank 16 so that the following problems result:

(1) The oil tank 16 requires a larger capacity than a mold clamping cylinder which is needed to prevent the sucking of air into the system so that the mold clamping device should be larger than necessary.

(2) A high-speed advancing movement will be unstable due to introducing oil into the rear chamber 14 of the clamping cylinder from the oil tank 16 by sucking. The oil path provided between the oil tank 16 and the rear chamber 14 of the clamping cylinder and the prefill valve 15 should be of a large-diameter to reduce fluid resistance.

(3) On switching to a tight clamping, a shock often occurs because the oil pressure in the rear chamber 14 is changed from a negative pressure to a high pressure very quickly. Thus, the time of the molding cycle is longer because rising pressure requires much time.

There is a mold clamping device disclosed in the Japanese Provisional Publication No. 53-42248 which comprises, a clamping piston, which is slidably fitted in a clamping cylinder, a clamping ram of the same diameter and a high-speed advancing cylinder provided on the front and rear faces of the clamping piston. An oil path is provided which can be opened or closed and connects the front and rear chambers of the clamping cylinder, and a small-diameter booster ram is slidably fit into the high-speed advancing cylinder.

In this clamping device, moving the clamping ram at a high speed by introducing oil into the high-speed advancing cylinder from the booster ram, does not create the problems stated above because the oil travels from the front chamber to the rear chamber without negative pressure in the rear chamber by connecting chambers provided on the front and rear sides of the clamping piston. However, with the structure of this device, the total length of the device should be more than twice as long as the clamping stroke so that the device should be large, heavy and expensive.

OBJECTS AND SUMMARY OF THE INVENTION

The present invention solves the above stated problems by providing a simple, compact, light and low cost device, whose length is half that of the conventional length, and which can be quickly switched to a tight clamping condition.

Another object of the present invention is to provide a mold clamping device which can be a standardized oil circuit or selecting parts design, and which can be easily designed, manufactured and controlled, The device of the present invention has a clamping cylinder which slidably fits a clamping ram whose front end is fixed on a movable board of injection molding machines, etc. The inner space of the clamping cylinder is divided into a rear chamber W and a front chamber X by the large-diameter piston section of the clamping ram. On the inner rear wall of the clamping cylinder, there is fixed a mold opening piston whose front end is slidably fit in the clamping ram from the rear. The inner space of the clamping ram is divided into a chamber Y and a chamber Z opening to the atmosphere by the large-diameter piston section of the opening piston. A hydraulic controlling device connects chambers X, Y and Z to an oil pressure source and connects chambers X and Y to chamber W for a high speed mold closure, connects chamber W to the oil pressure source and relieves the pressure in chambers X and Y for a tight clamping, and connects chamber Y to the oil pressure source and connects chamber W to both chamber X and the oil tank for opening the mold.

Note that, preferably, the effective pressure receiving area of the chamber Y is designed to be equal to the cross sectional area of the cylindrical section of the clamping ram.

The high-speed mold closure occurs by pressure working on the cross section of the cylindrical clamping ram when oil is introduced into the chambers W, X and Y. Following the advancing of the clamping ram, the oil in the chambers X and Y is introduced into the chamber W so that the high-speed mold closure is available, at that time the chamber W is not at a negative pressure.

The tight clamping occurs by pressure working to the effective pressure receiving area of the chamber W when pressure in the chamber W is increased and pressure in the chambers X and Y are reduced. Upon reducing pressure in the chambers X and Y, this tight clamping is quickly executed.

The mold opening occurs by pressure working to the effective pressure receiving area of the chamber Y when the oil is introduced into the chamber Y. Following the retracting of the clamping ram, the oil in the chamber W is introduced back into the chamber X and the rest is discharged to the oil tank.

When the effective pressure receiving area of the chamber Y and the cross-sectional area of the cylindrical section of the clamping ram is the same area, the quantity of the oil introduced from an oil pressure source during a high-speed mold closure is the same as the quantity of the oil introduced therefrom during a high speed mold opening so that speed of mold opening is approximately equal to the speed of closure dependent on a constant oil outflow from the oil pressure source.

Therefore, according to the present invention, the quantity of oil provided from the oil pressure source may be a portion of the capacity of the clamping cylinder in the clamping and opening mold, and the high speed operation is available in spite of a small outflow from the oil pressure source.

Especially during a tight clamping, the operation can be quickly changed to tight clamping by only reducing the pressure in chambers X and Y. Additionally, there is no need to provide a sucking tank or a prefill valve, as required in conventional devices. The total length can be reduced to half of the conventional mold clamping devices which have a clamping ram and a high-speed advancing cylinder, with the same diameters provided on the front and rear faces of the clamping piston. The mold clamping device of the present invention has a high speed efficiency and a high reliability, and can be a simplified structure, which is compact in size and manufactured at a reduced marketing cost, and so on.

Moreover, if the effective pressure receiving area of the chamber Y and the cross-sectional area of the cylindrical section of the clamping arm are substantially equal, the quantity of the oil provided at the mold opening is approximately equal to the quantity at mold clamping so that standardization can be achieving in designing oil circuits and selecting structural parts. Thus, design, manufacturing and control can be easily conducted.

BRIEF DESCRIPTION OF THE DRAWINGS

The invention will be apparent from the following description and the accompanying drawings, in which.

DETAILED DESCRIPTION OF PREFERRED EMBODIMENTS

Now preferred embodiments of the invention will be described with reference to accompanying drawings.

Figure 1:
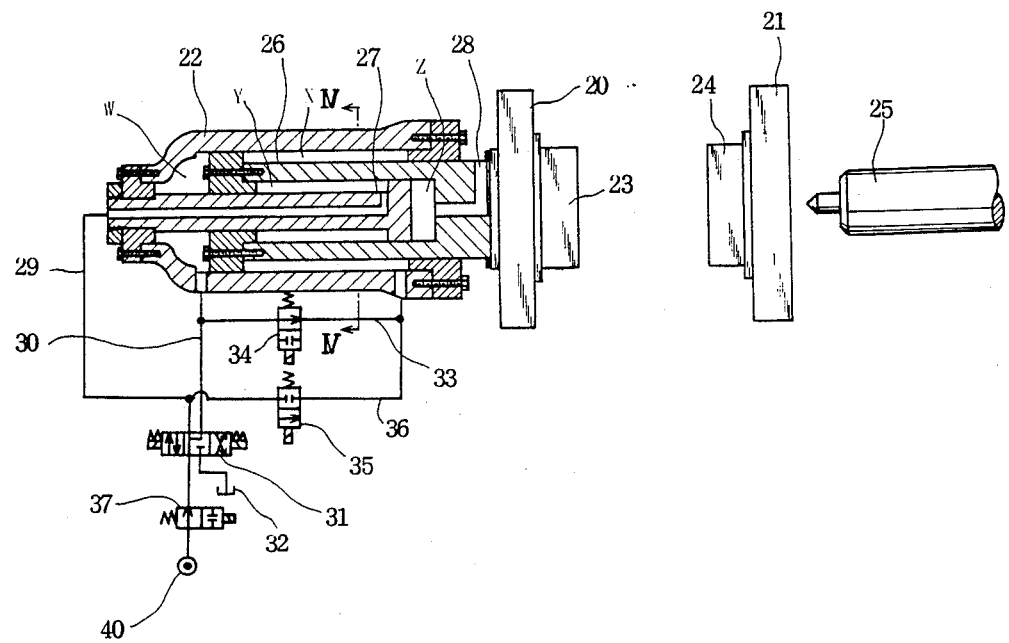
FIG. 1 shows a cross-sectional view of the mold clamping device of the present invention during changeover to the high-speed mold closure status from the mold open status.
Figure 2:
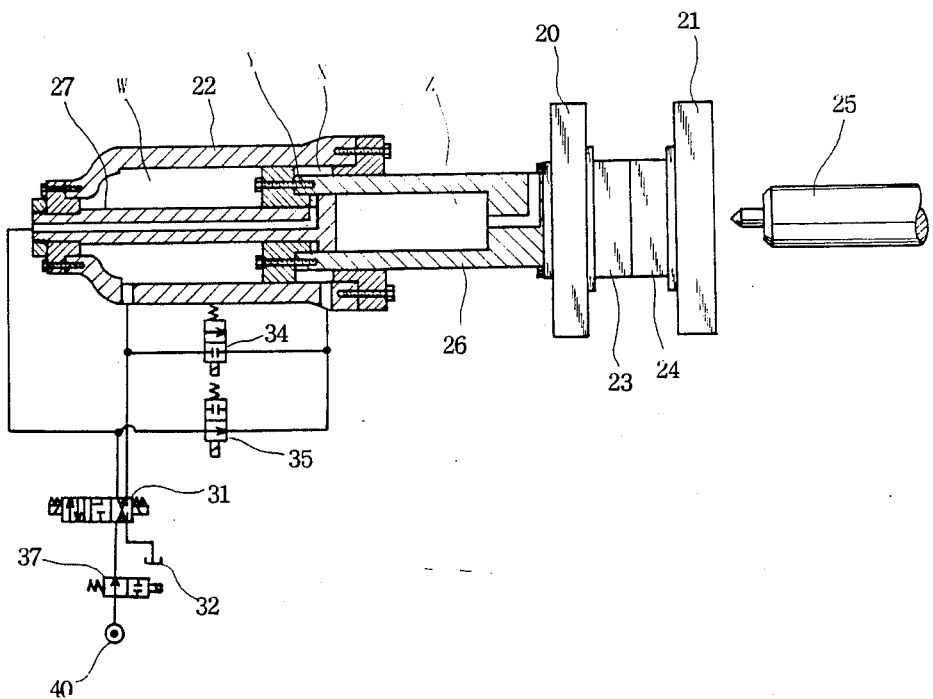
FIG. 2 shows a cross-sectional view during the tight clamping status.
Figure 3:
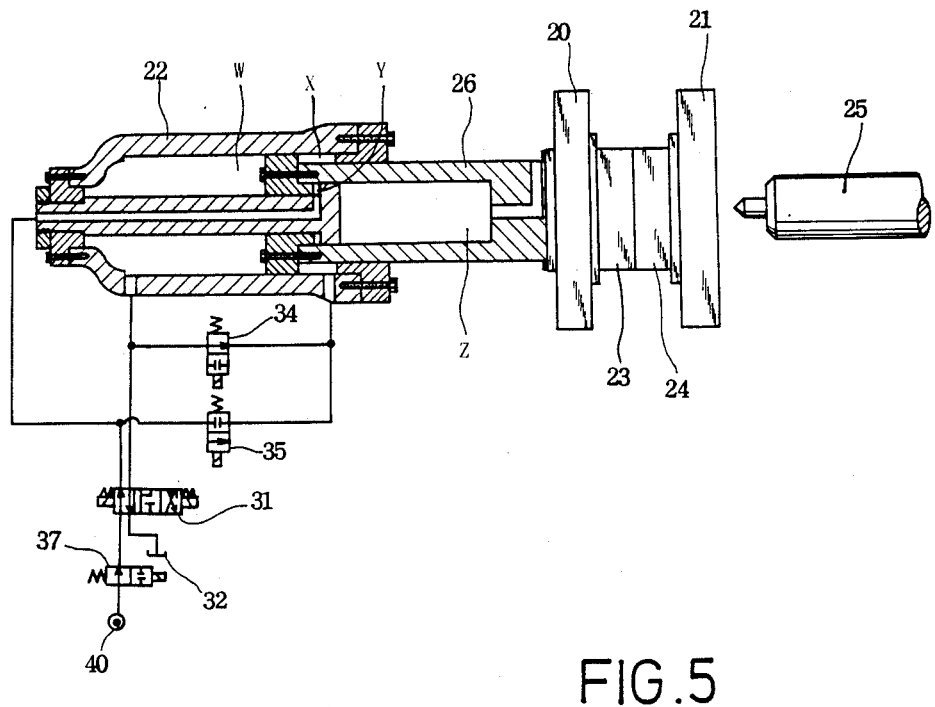
FIG. 3 shows a cross-sectional view during the status of just prior to changing to a mold opening.
Figure 5:
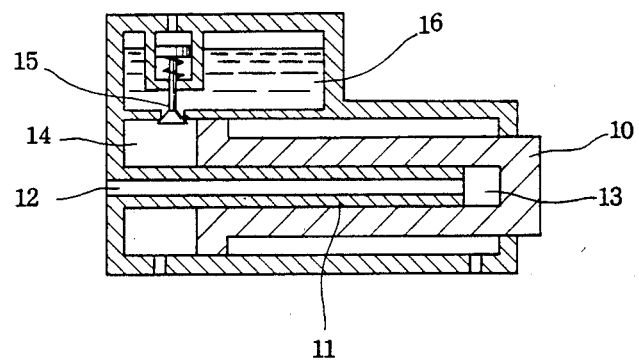
FIG. 5 shows an approximate cross-sectional view of a conventional booster ram type mold clamping device.

In FIGS. 1 to 3, a movable board 20 is guided to and away from a fixed board 21 by a tie bar, not shown, which is bridged between the fixed board 21 and a clamping cylinder 22.

On the opposite faces of the movable board 20 and the fixed board 21, there are provided a movable mold 23 and a fixed mold 24.

On a base (not shown) located to the rear of the fixed board 21, a conventional injection machine 25 is provided and is movable to and away from the fixed mold 24.

A clamping ram 26 having a front end connected to the rear face of the movable board 20 is slidably fit into the clamping cylinder 22. The inner space of the clamping cylinder 22 is divided into a rear chamber W and a front chamber X by the large-diameter piston section of the clamping ram 26. The largediameter piston section is provided at the rear end of the clamping ram 26.

A mold opening piston 27, having a rear end fixed to the inner rear wall of the clamping cylinder 22, is slidably fit into the clamping ram 26. The inner space of the clamping ram 26 is divided into a chamber Y and a chamber Z by the large-diameter piston section provided at the front end of the mold opening piston 27. The chamber Z is connected to the atmosphere by way of an air path 28.

Oil is introduced into or discharged from the chambers W and X via a port opening on the wall face of the clamping cylinder 22. The oil is also introduced into or discharged from the chamber Y via an oil path bored in the opening piston 27, one end being open at the rear end of the opening piston and the other end being open on the outer face of the opening piston into the chamber Y.

Because the large-diameter piston section of the clamping ram 26 is provided at a rear end thereof, and the large-diameter piston section of the piston 27 is provided at the front end of the opening piston 27, the total length of the device, including the clamping cylinder, is shortened as shown in FIG. 1.

The effective pressure receiving area S1 (the area of the piston section of the opening piston 27 minus the cross sectional area of the rod section of the opening piston) is designed to be substantially equal to the cross sectional area S2 of the cylindrical section of the clamping ram.

Note, that the effective pressure receiving area of the chamber X (the area of the piston section of the clamping ram 26 minus the cross-sectional area of the clamping ram) is defined as S3.

The chambers W and Y are connected to an oil pump 40 and an oil tank 32 via a three-position switching valve 31 which is bridged between an oil path 30 connected to the chamber W and an oil path 29 connected to the chamber Y.

The three-position switching valve 31 switches the oil paths 29 and 30 to one of the following three positions:

a position for connecting both the chambers W and Y to the oil pump 40 (shown in FIG. 1);

a position for connecting only the chamber W to the oil pump 40, and for connecting the chamber Y to the oil tank 32 (shown in FIG. 2); and a position for connecting only the chamber Y to the oil pump 40, and for connecting the chamber W to the oil tank 32 (shown in FIG. 3).

The chambers W and X are connected with each other by an oil path 33 branched from the oil path 30 and a switching valve 34 provided in the oil path 33.

The oil paths 29 and 33 are connected by an oil path 36 having a switching valve 35 in substantially the middle thereof.

A switching valve 37 is provided midway of the oil path connecting the oil pump 40 and the three-position switching valve 31. The switching valve 37 shuts the oil flow to prevent opening or clamping of the mold unnecessarily. Upon receiving a clamping or opening signal, the switching valve 37 releases the oil flow.

Note, that the above system included a three-position switching valve 31, switching valves 34, 35 and 37 controlled so as to switch to prescribed positions automatically by a control means (not shown) of the injection molding machine, etc. and storing control programs.

Next, the action of the device will be described.

Figure 4:
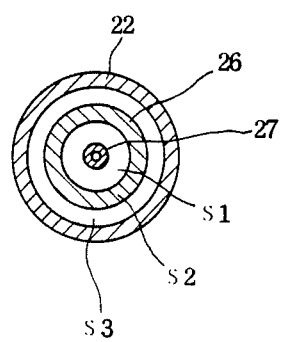
FIG. 4 shows a cross-sectional view of taken on line IV—IV of FIG. 1.

The high-speed mold closure:

The three-position switching valve 31, and switching valves 34, 35 and 37 are set at the position shown in FIG. 1. The chambers W, X and Y are connected to the oil pump 40 and then the chambers are pressurized. The pressure working in the chamber W is the value of a multiple of the area $S1+S2+S3$ shown in FIG. 4 by the oil pressure $P=S1\,P+S2\,P+S3\,P$. But the component pressure $S1\,P$ is countervailed by the pressure in the chamber Y and the component pressure $S3\,P$ is countervailed by the pressure in the chamber X, so that the clamping ram 26 is advanced by the component pressure $S2\,P$. Accompanying advancement of the clamping ram 26, the oil in the chamber X is introduced into a chamber W via the oil path 33, switching valve 34 and the oil path 30, and the oil in the chamber Y is also introduced into the chamber W via the oil path 29, the three-position switching valve 31 and the oil path 30.

Therefore, the oil quantity supplied to the chamber W from the oil pump 40 may be the quantity corresponding to the quantity multiplying the cross-sectional area S2 by the travelling length of the clamping ram so that the high speed mold closure can be supplied with oil independently of the capacity of the chamber W, and the chamber W will not be at a negative pressure.

The tight clamping:

In the high-speed mold closure, oil outflow from the oil pump 40 is reduced slightly before completing the mold closure, and the mold is finally closed at low speed and low pressure ($S2\,P$). The three-position switching valve 31, and switching valves 34 and 35 are changed to the position shown in FIG. 2 by the signal indicating completion of the high-speed mold closure.

The chamber W is connected to the oil pump 40 and is pressurized, as described above, and the chambers X and Y are connected to the oil tank 32 to relieve pressure so that component pressure $S1\,P$ and $S3\,P$ forcing against pressure in the chamber W disappears, with the pressure working on the clamping ram 26 becoming the value of $S1\,P+S2\,P+S3\,P$. Therefore, the tight clamping can be executed and the switching valve 37 is switched to the position of oil shut off to maintain a tight clamping status.

Mold opening:

In the tight clamping state, the following steps are executed. The the injection machine 25 comes into contact with the fixed mold 24, resin melt is injected into the molding mold, and the resin melt is cooled and solidified. After the above stated molding steps, a mold opening signal is generated, and thethree-position switching valve 31, the switching valves 34, 35 and 37 are switched to the positions shown in FIG. 3, and the oil outflow from the oil pump 40 is reduced. Therefore, the oil is introduced into the chamber Y via the three-position switching valve 31 and initial mold opening is executed by the component pressure $S1\,P$. After the molding product is ejected from the molding mold, the oil outflow is increased, and high-speed mold opening is executed. Slightly before the stop mold opening, the oil outflow is reduced again to slow down the speed of mold opening. Upon reaching the prescribed position, the oil outflow reduces to zero and the mold opening stops. After completing the mold opening, the molded product can be taken out.

Discharged oil from the chamber W following retracting the clamping ram 26 is introduced into the chamber X via the oil path 30, the switching valve 34 and the oil path 33, and the rest of the oil is returned to the oil tank 32.

In the above embodiment, we explained a mold clamping device for an injection molding machine, but the mold clamping device, of course, can be used for die casting machines and similar machines.

Additionally, the hydraulic controlling device including the three-position switching valve 31, the switching valves 34, 35, 37, etc. is not restricted by the above embodiment.

Now that we have explained the invention in detail, this invention is not intended to be restricted by the above stated embodiment and modifications of course, can be executed without deviation from the spirit of the invention.

What is claimed is:

1. A process for clamping a mold clamping device including a molding machine having a fixed mold with a fixed board and a movable mold with a movable board, a clamping cylinder slidably fitted with a clamping ram , a front end at said clamping ram is fixed on said movable board of said molding machine, an inner space of said clamping cylinder being divided into a rear chamber and a front chamber by a large-diameter piston section of said clamping ram, a mold opening piston having one end fixed to an inner rear wall of said clamping cylinder and the other end slidably positioned within an inner space of said clamping ram, said mold opening piston divides said inner space of said clamping ram into a first chamber and a second chamber, said second chamber constantly being open to the atmosphere at said front end of said clamping ram where said clamping ram is fixed to said movable board of said molding machine, said process comprising the steps of:

a step of high speed mold closure during which said rear chamber, said front chamber and said first chamber are pressurized by connecting to an oil pressure source , said front chamber and said first chamber are connected to said rear chamber, and the oil in said front chamber and said first chamber is introduced into said rear chamber;

a step of tight clamping during which said rear chamber is pressurized by connecting to said oil pressure source after mold closure, and said front chamber and said first chamber are connected to an oil tank to release pressure; and a step of high speed mold opening during which said first chamber is pressurized by connecting to said oil pressure source said rear chamber and said front chamber are connected to each other and said rear chamber is connected to said oil tank to introduce the oil in said rear chamber into said front chamber, and the rest of the oil is introduced into said oil tank.

* * * * *